United States Patent [19]

Harder

[11] Patent Number: 4,572,550

[45] Date of Patent: Feb. 25, 1986

[54] MOVABLE CARRIER FOR SUPPLY LINES PLACED ALONG A TELESCOPING AIRPLANE PASSENGER BRIDGE

[75] Inventor: Helmut Harder, Kassel, Fed. Rep. of Germany

[73] Assignee: Thyssen Industrie Aktiengesellschaft, Essen, Fed. Rep. of Germany

[21] Appl. No.: 552,507

[22] Filed: Nov. 17, 1983

[30] Foreign Application Priority Data

Jul. 2, 1983 [DE] Fed. Rep. of Germany ... 8319159[U]

[51] Int. Cl.$^4$ .............................................. F16L 59/16
[52] U.S. Cl. ..................................... 285/47; 285/276; 285/281; 14/71.5; 141/231; 244/137
[58] Field of Search .................. 14/71.5; 244/137 P; 191/12 R; 137/615; 141/231; 98/39, 37; 285/137 R, 276, 281, 47

[56] References Cited

U.S. PATENT DOCUMENTS

| 1,123,074 | 12/1914 | Bliss | 285/47 X |
|---|---|---|---|
| 2,133,731 | 10/1938 | Gottwald | 285/137 R |
| 2,388,841 | 11/1945 | Goodwin | 285/276 |
| 2,448,395 | 8/1948 | Schaetzly | 285/276 X |
| 2,511,386 | 6/1950 | Warren | 285/276 X |
| 3,002,241 | 10/1961 | Scurlock | 285/137 R |
| 3,496,959 | 2/1970 | Wolfe et al. | 137/615 |
| 3,521,316 | 7/1970 | Adams et al. | 14/71.5 |
| 4,391,297 | 7/1983 | Knight | 137/615 |

FOREIGN PATENT DOCUMENTS

| 2415771 | 9/1971 | France | 14/71.5 |
|---|---|---|---|
| 675935 | 7/1952 | United Kingdom | 285/47 |

Primary Examiner—Richard J. Scanlan, Jr.
Attorney, Agent, or Firm—Becker & Becker, Inc.

[57] ABSTRACT

A movable carrier for fixed supply lines which are placed along a telescoping airplane passenger bridge and which establish communication between connectors on the airport terminal and corresponding connectors on the aircraft. The carrier is a supply line system, the length of which cannot be varied, and which includes a plurality of linear conduits having swivel joints interposed on those ends thereof which face one another. At least two adjacent conduits are vertically angularly movable, and have one end thereof held in position. Each conduit, along sections thereof, is provided with two-part support brackets which are embodied as clamps and are provided with holding devices for receiving further supply lines which are arranged around the conduit.

1 Claim, 4 Drawing Figures

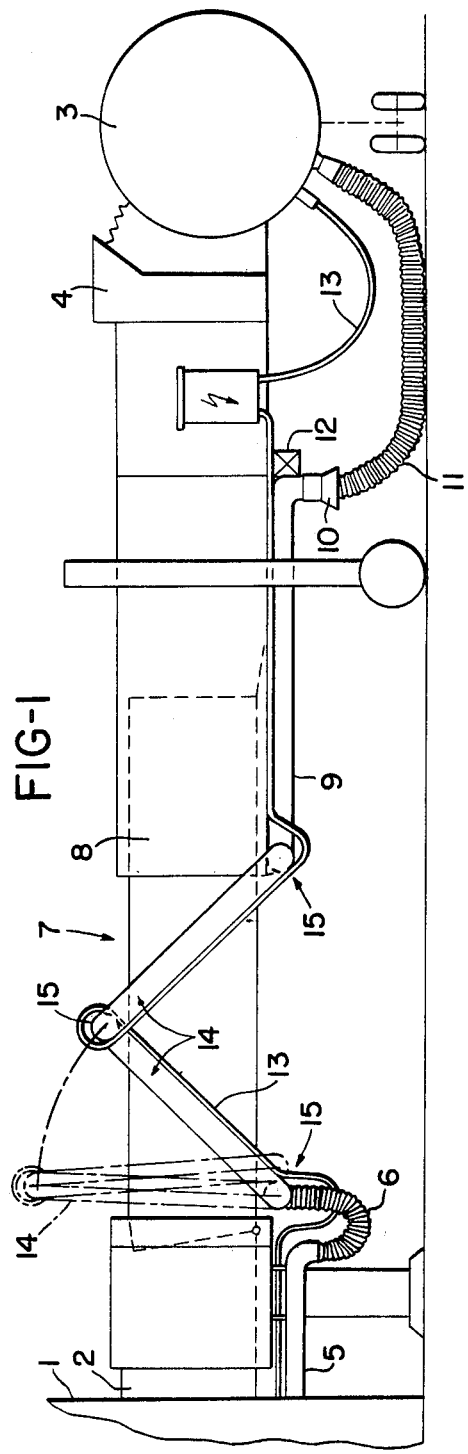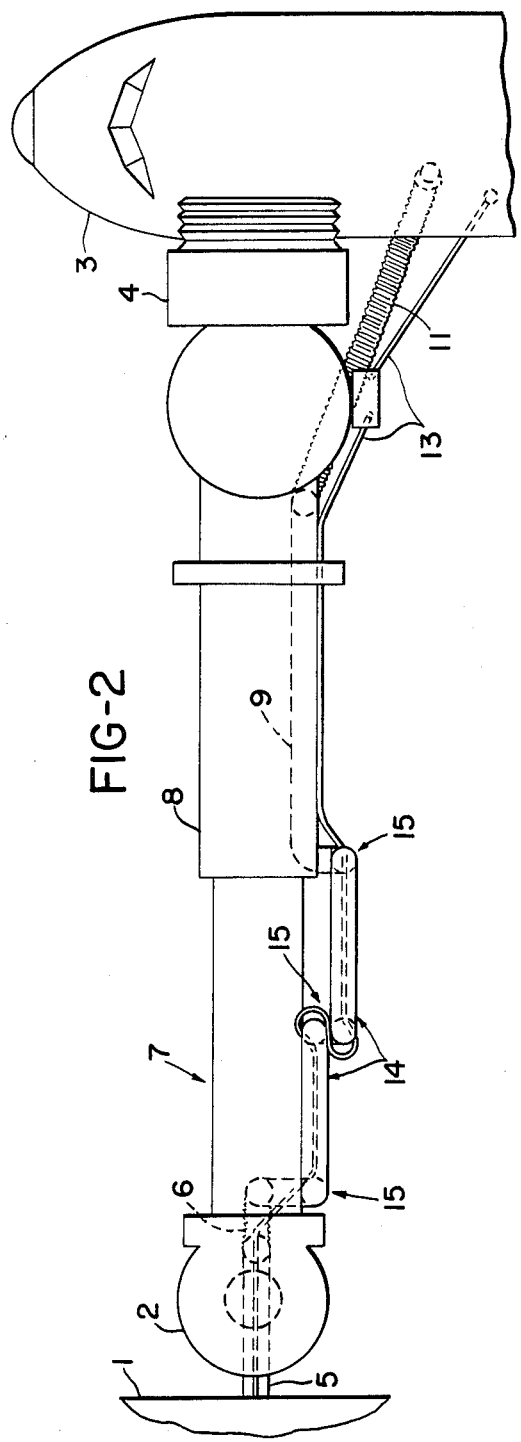

MOVABLE CARRIER FOR SUPPLY LINES PLACED ALONG A TELESCOPING AIRPLANE PASSENGER BRIDGE

BACKGROUND OF THE INVENTION

1. Field of the Invention

The present invention relates to a movable carrier for fixed supply lines which are placed along a telescoping airplane passenger bridge or jetway, and which establish communication between connectors on the airport terminal and corresponding connectors on the aircraft.

To prepare an aircraft which is parked at an airport for the next flight, the aircraft is supplied with air for air conditioning and take-off, as well as with electrical energy, which are supplied via suitable supply lines.

2. Description of the Prior Art

German Offenlegungsschrift No. 19 01 457 discloses disposing the carrier for the supply lines of a telescoping airplane passenger bridge on the movable tunnel sections. The telescopically movable conduits for the supply of air for air conditioning and take-off which are used with this heretofore known carrier are mounted next to and at a distance from one another, and the cable for the electrical energy is spaced thereabove on the respectively associated carrier. The supply of air for air conditioning is effected via a flexible tubing which is located in the conduit so that the temperature of the air for air conditioning does not change appreciably on the way to the aircraft. The cables for the supply of electricity are constantly kept taut via a tensioning device not only during retraction but also during extension of those tunnel sections of the airplane passenger bridge which are telescoped within one another. A drawback to this is that separate carriers are required for the air supply lines and the electrical lines, and that furthermore a tensioning device is necessary for the electrical lines.

A brochure of the company Teledyne-Inet of Gardena, Calif., discloses a carrier system for a wave-like or linearly arranged cable as a supply line; this system comprises a plurality of conduits which are disposed one after the other on a telescoping airplane passenger bridge. The linear cable sections are protected against damage or the effects of weather by the conduits which surround them, and the cable sections which are located externally of the conduits are supported on supporting members for forming bends. Two of these conduits are associated with each tunnel section of the telescoping airplane passenger bridge. Both the conduits in the base region of the tunnel and those above the tunnel section are linked with one another respectively. For the other supply lines, further separate carriers are required, so that the disposition and support of all of the supply lines is complex and expensive.

An object of the present invention therefore is to provide a movable carrier for all of the supply lines which are placed along a telescoping airplane passenger bridge which is simple in construction, is inexpensive to produce, and requires little space for placement or installation thereof.

BRIEF DESCRIPTION OF THE DRAWINGS

This object, and other objects and advantages of the present invention, will appear more clearly from the following specification in conjunction with the accompanying drawings, in which:

FIG. 1 is a side view of a telescoping airplane passenger bridge between an airport terminal and an aircraft showing one inventive embodiment of a carrier for the supply lines;

FIG. 2 is a plan view of the illustration of FIG. 1;

SUMMARY OF THE INVENTION

Figure 3:
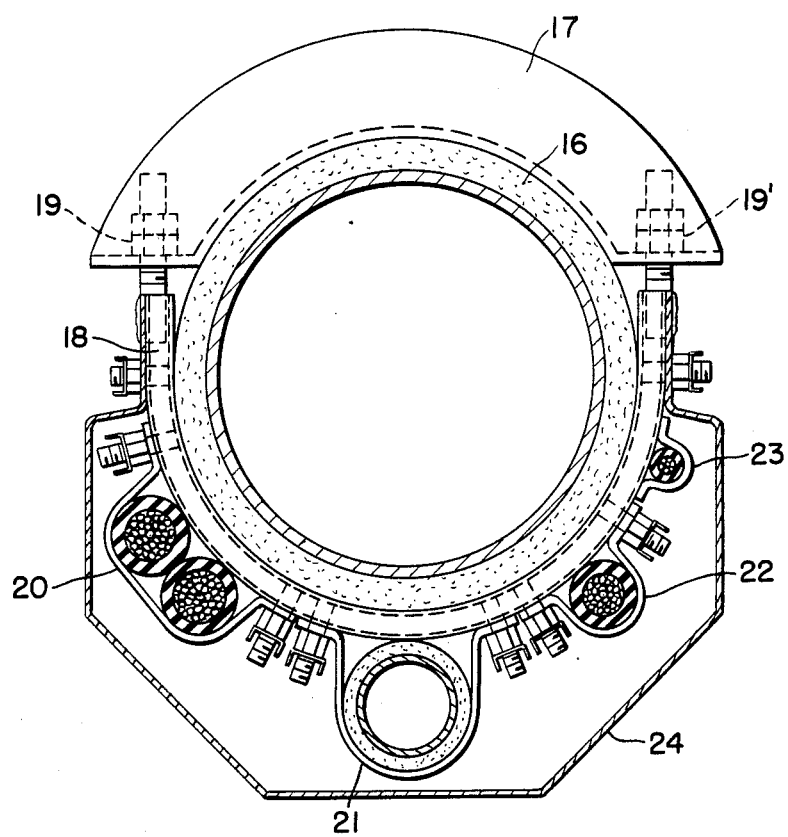
FIG. 3 is a cross section, to a larger scale, through a linear conduit of the inventive carrier.

The carrier of the present invention is characterized primarily as a supply line system, the length of which cannot be altered, and which comprises a plurality of linear conduits having swivel joints interposed at those ends thereof which face one another. At least two adjacent conduits are vertically angularly movable, and have one end thereof held in position. Each conduit, along sections thereof, is provided with two-part support brackets which are embodied as clamps and are provided with holding means for receiving further supply lines which are disposed around the conduit.

The advantages achieved with the present invention consist especially in that the carrier itself is embodied as a supply line, and at the same time serves as a common line carrier for all supply lines which were previously placed on separate carriers along the telescoping airplane passenger bridge, including the energy and signal cable required for supplying the telescoping airplane passenger bridge itself.

Furthermore, there is even possible to supply liquid materials, such as drinking water or the like, to the aircraft through the inventive supply line; previously, there was possible only to supply liquid material to the aircraft by means of special vehicles.

Pursuant to a preferred embodiment of the present invention, each swivel joint, which serves as a conduit connector, may comprise two conduit bends which are supported in such a way as to be rotatable about the longitudinal axes, of the conduit bends and are connected with one another in a pressure-tight manner. Both conduit bends may have approximately the same length, and one conduit bend may project into a central recess of the other conduit bend and may further serve as a pivot bearing of a roller bearing. For axially securing the two conduit bends, which are rotatably disposed within one another, relative to one another, a support member may be provided which is arranged on the end face of that conduit bend which is provided with the central recess, and is detachably connected therewith.

Pursuant to a further specific embodiment of the present invention, each conduit and each swivel joint can be surrounded by a suitable molded part of insulating material.

DESCRIPTION OF PREFERRED EMBODIMENTS

Referring now to the drawings in detail, the telescoping airplane passenger bridge or jetway illustrated in FIG. 1 is connected to the airport terminal 1 via a rotunda 2, and to the aircraft 3 via a cabin 4. To supply the aircraft 3 with air for air conditioning and take-off, a rigid, fixed conduit 5 extends from the airport terminal 1 to below the rotunda 2. A flexible tubing 6 is connected to the rigid fixed conduit 5. The other end of the flexible tubing 6 is connected to that swivel joint which faces the terminal; this swivel joint is part of the movable carrier 7, the length of which cannot be varied, and which serves to support the supply lines.

On the end facing the aircraft, the movable carrier 7 is connected via a similar swivel joint with a further extending conduit 9 which is rigidly mounted below the bridge tunnel 8 of the telescoping airplane passenger bridge. That end of the conduit 9 which faces the aircraft is bent downwardly and is provided with a funnel 10 for introduction of the tubing 11, which leads to the aircraft 3 where the tubing is coupled. Prior to placement of the telescoping airplane passenger bridge, the tubing 11 is pulled into the funnel 10 by means of a pulling device 12.

As an example of a further supply line for the aircraft, a cable 13 for supplying power to the aircraft is illustrated. This cable 13 extends approximately parallel to the aforementioned conduit 5 and along the movable carrier 7 and the conduit 9 to a transformer, from which the cable leads to the aircraft, where the cable is connected.

The movable carrier 7 comprises a plurality of linear, angularly movable conduits 14, with swivel joints 15 being interposed between those ends which are directed toward one another. The position of the carrier 7 for the supply lines, when the airplane passenger bridge is telescoped in, or retracted is indicated in FIG. 1 in a dot-dash manner next to the rotunda 2.

In the cross section of FIG. 3 through one conduit of the movable carrier 7, the steel conduit, which is not illustrated in greater detail, is surrounded or covered with an insulation 16 and is provided with two-part support brackets 17, 18, which are spaced from one another at a certain distance and are held together by means of bolt connections 19, 19' on both sides.

A plurality of holding means or clamps 20, 21, 22, 23 can be fastened on the support bracket for receiving further supply lines, and can be covered by a hood 24 which is also fastened on the support bracket.

Figure 4:
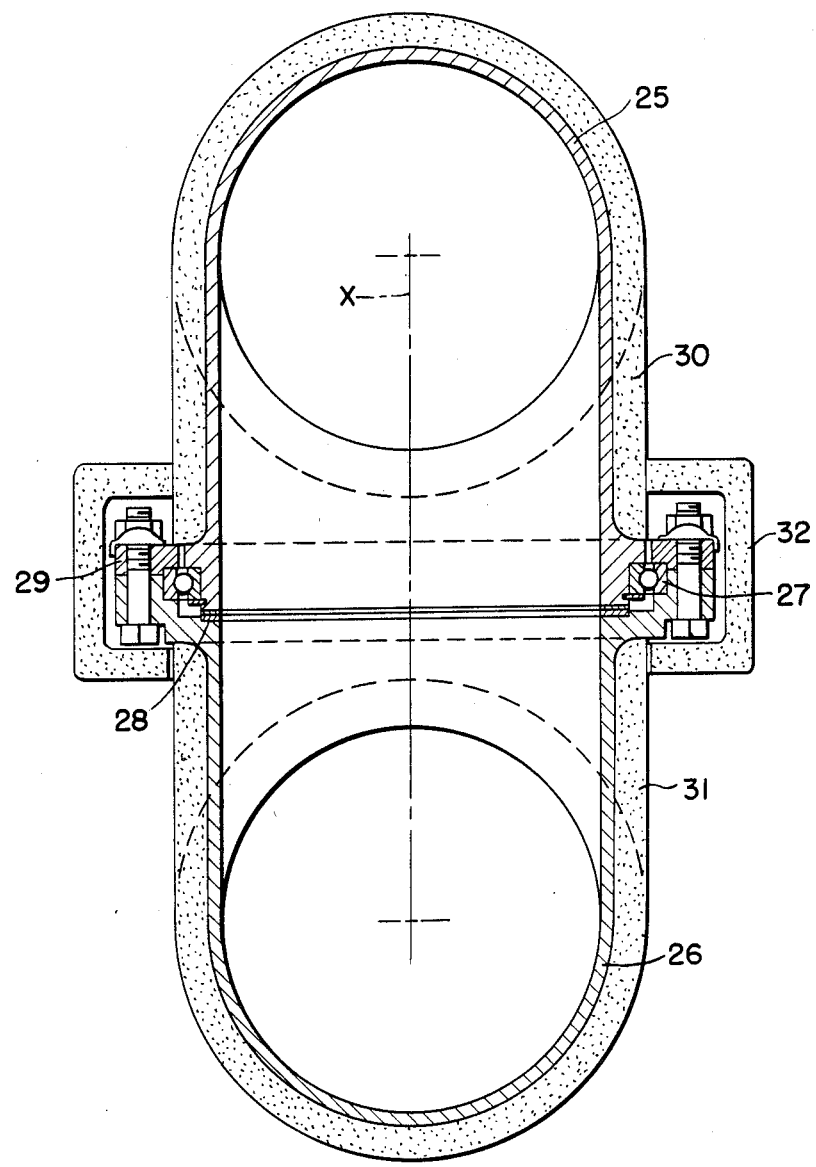
FIG. 4 is a longitudinal section, to a larger scale, through one swivel joint which serves as a conduit connector and comprises two conduit bends.

In the embodiment illustrated in FIG. 4, the swivel joint, which serves as a conduit connector, comprises two conduit bends 25, 26 which can be rotated about the longitudinal axis X thereof by means of a roller bearing 27, and which can be sealed by means of a slide ring seal 28.

In order to secure the two cooperating conduit bends axially relative to one another, a support member 29 can be provided which is detachably mounted to one of the conduit bends.

The conduit bends 25, 26 which are rotatably disposed with conduit bend 25 within a central recess in conduit bend 26, are also surrounded with molded parts 30, 31, 32 of insulating material.

The present invention is, of course, in no way restricted to the specific disclosure of the specification and drawings, but also encompasses any modifications within the scope of the appended claims.

What I claim is:

1. A movable carrier for fixed supply lines which are placed and clamped in predetermined positioning along a telescoping airplane passenger bridge, and which establish communication between connectors at the airport terminal and corresponding connectors on an aircraft; said carrier comprising:

a supply line system, the length of which cannot vary, and which includes a plurality of linear conduits and swivel joints which are respectively interposed at those ends of said conduits which face one antoher; at least two adjacent ones of said conduits being vertically, angularly movable, as well as having one end of each thereof held in position relative to said passenger bridge; each conduit, along sections thereof, being provided with two-piece support brackets which are embodied as clamps and are provided with holding means for receiving further supply lines which are disposed around that conduit;

each of said swivel joints, which serve as conduit connectors, comprising two conduit bends which are supported in such a way as to be rotatable about longitudinal axes thereof, and which are connected to one another in a pressure-tight manner; both of said conduit bends being approximately the same length, and one of them being provided with a central recess for receiving the other one therein; a pivot bearing in the form of a roller bearing being disposed between said conduit bends to permit said rotation thereof; a support member being provided for axially securing said two conduit bends, which are rotatably disposed within one another, relative to one another; said conduit bend being provided with said recess having an end face, to which said support member is detachably connected; and molded parts which are made of insulating material and surround each of said conduits, respectively, and each of said swivel joints, respectively; said conduits and said swivel joints with the carrier itself serving for supply function; said conduits being connected via said swivel joints only at ends thereof toward each other as well as an axis of each swivel joint being located in the zenith of conduit axes, each swivel joint also having a constant-opening cross section over entire length thereof complementary to said conduits.

* * * * *